United States Patent
Hein

(10) Patent No.: US 10,160,262 B2
(45) Date of Patent: Dec. 25, 2018

(54) CONTROL OF ROLLERS MOUNTED ON A MOVABLE PART

(71) Applicant: TENTE GmbH & Co. KG, Wermelskirchen (DE)

(72) Inventor: Georg Hein, Luedenscheid (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 0 days.

(21) Appl. No.: 15/035,858

(22) PCT Filed: Oct. 24, 2014

(86) PCT No.: PCT/EP2014/072875
§ 371 (c)(1),
(2) Date: May 11, 2016

(87) PCT Pub. No.: WO2015/071076
PCT Pub. Date: May 21, 2015

(65) Prior Publication Data
US 2016/0297242 A1 Oct. 13, 2016

(30) Foreign Application Priority Data

Nov. 18, 2013 (DE) .................... 20 2013 105 191 U
Jan. 6, 2014 (DE) ........................ 10 2014 100 056

(51) Int. Cl.
*A61G 1/02* (2006.01)
*B60B 33/02* (2006.01)
(Continued)

(52) U.S. Cl.
CPC .......... *B60B 33/021* (2013.01); *A61G 1/0243* (2013.01); *A61G 1/0268* (2013.01);
(Continued)

(58) Field of Classification Search
CPC .............. B60B 33/021; B60B 33/0092; B60B 33/0094; A61G 7/0528; A61G 1/0243;
(Continued)

(56) References Cited

U.S. PATENT DOCUMENTS 7,195,253 B2 * 3/2007 Vogel ....................... A61G 7/00
16/35 R
7,284,626 B2 * 10/2007 Heimbrock ............ A61G 7/018
180/19.1
(Continued)

FOREIGN PATENT DOCUMENTS

CA 2 825 244 A1 8/2012
EP 1 911 429 A2 4/2008
(Continued)

OTHER PUBLICATIONS

International Search Report of PCT/EP2014/072875, dated Jan. 20, 2015.
(Continued)

*Primary Examiner* — Jacob D Knutson
*Assistant Examiner* — Marlon A Arce
(74) *Attorney, Agent, or Firm* — Collard & Roe, P.C.

(57) ABSTRACT

The invention relates to a control and to a method for controling rollers (2) mounted on a movable part such as, for example, a hospital bed (1), wherein one, several or all of the rollers (2) have a brake mechanism which can be set to a brake position and a release position, further preferably also to a direction-setting position, wherein, further, all the rollers (2) can be actuated electrically and one or several or all of the rollers (2) can in addition be actuated manually, and wherein, furthermore, an additional roller (3) with a wheel having a travel drive is provided, which additional roller (3) is preferably movable between a lowered position and a raised position. In order to obtain an advantageous
(Continued)

control of the rollers in combination with the additional roller and also to provide an advantageous control method for this purpose, it is proposed that the travel drive can be activated only when the rollers (2) are located in the release position or the direction-setting position.

14 Claims, 1 Drawing Sheet

(51) Int. Cl.
*A61G 7/05* (2006.01)
*B60B 33/00* (2006.01)
*B60B 33/06* (2006.01)

(52) U.S. Cl.
CPC ......... *A61G 1/0275* (2013.01); *A61G 1/0281* (2013.01); *A61G 1/0287* (2013.01); *A61G 7/05* (2013.01); *A61G 7/0528* (2016.11); *B60B 33/0092* (2013.01); *B60B 33/0094* (2013.01); *B60B 33/02* (2013.01); *B60B 33/026* (2013.01); *B60B 33/028* (2013.01); *B60B 33/06* (2013.01); *A61G 2203/12* (2013.01); *A61G 2203/16* (2013.01); *A61G 2203/36* (2013.01); *A61G 2203/726* (2013.01)

(58) Field of Classification Search
CPC .. A61G 1/0268; A61G 1/0275; A61G 1/0281; A61G 1/0287; A61G 7/05; A61G 2203/12
See application file for complete search history.

(56) References Cited

U.S. PATENT DOCUMENTS

| | | | |
|---|---|---|---|
| 8,602,136 B2* | 12/2013 | Altena | A61G 5/04 |
| | | | 180/19.1 |
| 8,978,795 B2 | 3/2015 | Block et al. | |
| 9,259,369 B2* | 2/2016 | Derenne | A61G 7/012 |
| 2003/0102172 A1 | 6/2003 | Kummer et al. | |
| 2005/0126835 A1 | 6/2005 | Lenkman | |
| 2007/0157385 A1 | 7/2007 | Lemire et al. | |
| 2010/0077562 A1 | 4/2010 | Block et al. | |
| 2010/0181122 A1 | 7/2010 | Block et al. | |

FOREIGN PATENT DOCUMENTS

| | | |
|---|---|---|
| WO | 2007/093549 A1 | 8/2007 |
| WO | 2008/055831 A1 | 5/2008 |
| WO | 2012/110283 A1 | 8/2012 |
| WO | 2012/171814 A1 | 12/2012 |

OTHER PUBLICATIONS

Letter from German Patent Attorney to European Patent Office dated Aug. 19, 2015 regarding PCT/EP2014/072875 with English translation of relevant parts.

* cited by examiner

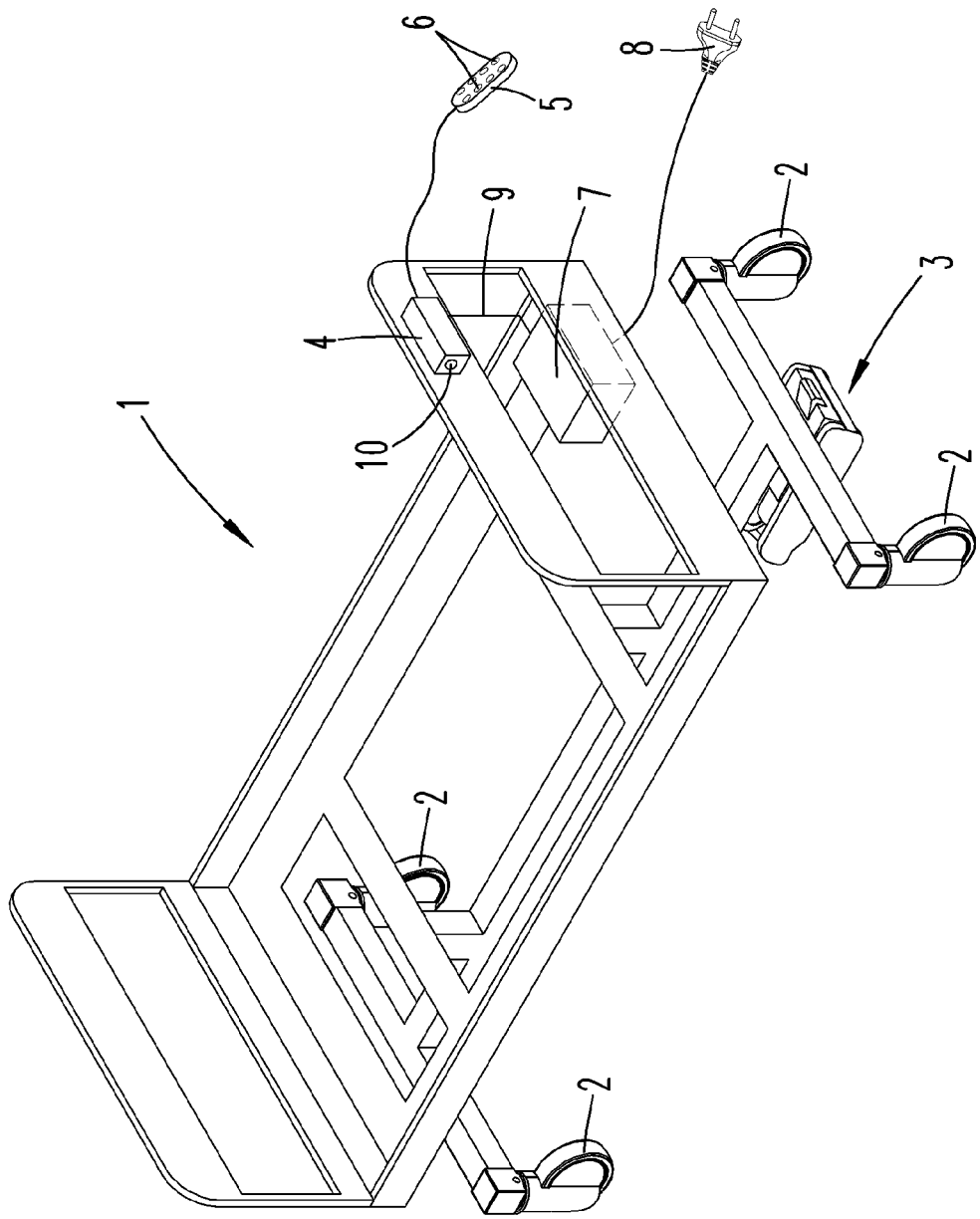

CONTROL OF ROLLERS MOUNTED ON A MOVABLE PART

CROSS REFERENCE TO RELATED APPLICATIONS

This application is the National Stage of PCT/EP2014/072875 filed on Oct. 24, 2014, which claims priority under 35 U.S.C. § 119 of German Application No. 20 2013 105 191.8 filed on Nov. 18, 2013 and German Application No. 10 2014 100 056.0 filed on Jan. 6, 2014, the disclosures of which are incorporated by reference. The international application under PCT article 21(2) was not published in English.

The invention initially relates to a control of rollers mounted on a movable part. The invention further relates to a method for controlling rollers mounted on a movable part.

Such movable units, for example, configured as a hospital bed, are known in various aspects. Reference is made, for example, to WO 2007/093549 A1 (US 2010/0181122 A1). In addition, reference is also made to WO 2012/110283 A1 (CA 2925244 A1).

For the prior art, reference is further made to US2007/157385 A1, US 2003/102172 A1, EP 1911429 A2 and US 2005/126835 A1.

Starting from the initially mentioned prior art, the invention is concerned with the object of providing an advantageous control of the rollers in combination with the additional roller and also an advantageous method for control for this purpose.

This object is initially solved by the control in accordance with one aspect of the invention, where the focus is on the fact that the travel drive can only be activated when the roller having a braking mechanism is located in the release position or the direction-setting position and the automatic setting of the one or several rollers to the brake position can only be made when the travel drive is not activated.

This object is further solved by the method for control in accordance with another aspect of the invention, where the focus is on the fact that the travel drive can only be activated when the rollers are located in the release position or the direction-setting position wherein furthermore the automatic setting of the rollers to the brake position can only be made when the travel drive is not activated.

When the rollers are located in the brake position, in particular the totally fixed position in which therefore neither a movement of the wheel nor a rotation about a vertical axis is possible, the travel drive cannot be activated. A corresponding actuation of a switch on a control part of the movable unit as is preferably provided, therefore brings about no response.

The circuit is accordingly provided so that in the brake position a possible instruction or a command for activation of the travel mode of the additional roller is suppressed in the control or cannot produce any signal, possibly as a result of electrical isolation of the relevant switch.

The method is also accordingly configured so that in the brake position a possible instruction or a command for activation of the travel mode of the additional roller is suppressed or in any case brings about no response.

In this case, it can further be provided in terms of control and also in terms of method that the additional roller, when this is movable in the manner described between a lowered position, which preferably corresponds to the position used for the travel drive, and a raised position, cannot be moved in the first place from the raised position into the lowered position.

Furthermore, it can be provided in terms of control and in terms of method that upon actuation of the control or upon execution of the method to the effect that one, several or all the rollers are set to the brake position, in particular the totally fixed position, the additional roller, when this is located in the lowered position, is automatically moved or will move into the raised position.

In this case, further preferably a ground contact of the wheel of the additional roller is only given in the lowered position, so that a drive of the movable unit can be accomplished by this means. In the raised position, the wheel is preferably usually at a distance from the ground on which the movable unit is also standing or moving.

In a further embodiment it is also provided that an automatic setting of the rollers to a braking position is provided, for example, when the movable unit has come to a standstill. This can be detected, for example, by means of a motion sensor. The motion sensor can be mounted on the movable unit at a distance from the rollers. This can be a motion sensor, which detects a movement of a wheel, optionally also additionally or only of one wheel of the additional roller, alternatively or additionally however also a motion sensor which detects a movement of the movable unit as such. A motion sensor can be provided for each roller, including the additional roller. Preferably however only one motion sensor is provided for all the rollers which is suitably incorporated in the circuit for actuation of the rollers.

The circuit or the method provides that the automatic setting of the rollers to the brake position is only provided or can only be performed when the travel drive is not activated as long as an additional drive or a drive for the movable unit is given via the additional roller, no setting of the rollers to the brake position can be achieved even in response to a corresponding actuation of a switch, touch display or the like although provided in principle.

This can also be supplemented in that the setting of the roller to the brake position is already not possible or cannot be performed if, as far as provided, the additional roller is located in the lowered position.

Furthermore, the movable unit can preferably have a rechargeable battery. With the rechargeable battery as energy source, the additional roller can be driven electrically when the movable unit is moved independently of the mains. This rechargeable battery can be recharged by means of a connection to the electrical mains, preferably via a mains plug, which is then further preferably part of the movable unit, when required or from time to time, when the movable unit is at a standstill in any case or is not being used, by plugging into a mains socket. Here it is further preferably provided that when a mains connection is made between the mains plug and the socket, the rollers are automatically set to the brake position and/or the travel drive cannot be activated.

The fact that the mains plug is plugged into a corresponding socket, can be detected by means of the mains voltage then applied for which a corresponding detection circuit is provided in the control unit or assigned to the control unit of the movable unit.

Since the rollers are automatically set to the brake position when making the mains connection, it is ensured that during charging no movement of the movable unit can take place, i.e. the mains plug cannot be inadvertently ripped out of the socket.

Since additionally or alternatively the travel drive of the additional roller cannot be activated when the mains connection is made, it can in particular be ensured that the movable unit cannot yet be moved with the force of the electrical drive.

BRIEF DESCRIPTION OF THE DRAWINGS

The sole FIGURE shows the chassis of a movable hospital bed having the control of rollers mounted thereon in accordance with the invention.

A hospital bed 1 depicted only as a chassis, which is a possible movable unit of relevance here, is depicted and described with reference to the single FIGURE.

The hospital bed has four rollers 2 which, for example, are configured according to WO 2008/055831 A1 (US 2010/0077562 A1) or WO 2012/171814 A1. The disclosure content of these documents is herewith also included in its full extent in the disclosure of the present application With a view to a possible structure of such a roller, also for the purpose of including features from these documents in claims of the present application.

The movable unit or the hospital bed 1 further has an additional roller 3 which is shown in the raised position in the reproduced FIGURE. With regard to this additional roller, reference is also made at this point to the documents already mentioned initially.

The movable unit or the depicted hospital bed 1 further has a control device 4 which, by means of a hand piece 5, which can also be integrated into the movable unit itself as a control panel, makes it possible to control and operate the rollers 2 and the additional roller 3. For this purpose various switches and displays 6 can be provided on the hand piece 5.

The movable unit is furthermore provided with a rechargeable battery 7. By means of the rechargeable battery, the drivable wheel of the additional roller 3 can be driven electrically by means of a suitable power connection.

A mains plug 8 is provided for charging the rechargeable battery 7 which, when the movable unit is at a standstill, can be plugged into a usual socket of an electrical mains for charging the rechargeable battery 7.

The lead 9 indicates that the rechargeable battery 7 and the mains plug 8 are also connected to the control unit 4. In particular, it can be detected in the control unit 4 whether the mains plug 8 is located in the socket or not.

The rollers 2, as preferably also given in the exemplary embodiment, are all fitted with their own electric motor to enable a setting of the roller to a free-running position, a direction-setting position or a totally fixed position.

Furthermore in order to enable operation even in the event of a possible failure of an electrical supply, the rollers 2 can additionally be actuated by hand. For this purpose reference is additionally made to the aforesaid documents such as possibly WO 2012/171814.

Such an actuation by hand or manual actuation can in particular mean a solution of the totally fixed position. Via the additional roller 3, a person operating the movable unit can receive assistance with the movement of the movable unit through the drivable wheel. In the exemplary embodiment, this is accordingly only possible in the lowered position of the additional roller 3 in which the wheel of the additional roller is in contact with the ground.

The implemented control provides that the travel drive of the wheel of the additional roller 3 can only be activated, in the exemplary embodiment, via the hand piece 5, when the rollers 2 are in the release position or the direction-setting position.

It is further provided that, for example, by means of a motion sensor 10 which, as indicated, can be located in the control unit 4, the control automatically detects whether the movable unit, here the hospital bed 1, is in motion or at a standstill. In this connection, it is provided that when the movable unit is at a standstill, the rollers 2 are automatically set to the brake position, here the position of the totally fixed position. This setting of the rollers 2 in the totally fixed position can however only take place, in particular can only take place automatically when it is at the same time detected by means of the control that the travel drive of the additional roller 3 is not activated. In addition, an automatic setting of the rollers 2 to the brake position, here the totally fixed position, can only take place when it is additionally detected by the control that the hospital bed 1 is not moving. This is possibly accomplished via the aforesaid motion sensor 10.

Furthermore, the implemented control provides that when a mains connection is made, i.e. the mains plug 8 is plugged into a corresponding socket, the rollers 2 are automatically set to the braking position, i.e. here the totally fixed position. At the same time, the control provides that in this case, the travel drive of the wheel of the additional roller 3 cannot (can no longer) be activated.

The preceding explanations are used to explain the inventions covered overall by the application which each independently further develop the prior art by the following combinations of features, namely:

A control which is characterized int hat the travel drive can only be activated when the rollers are located in the release position or the direction-setting position.

A method which is characterized in that the travel drive can only be activated when the rollers 2 are located in the release position or the direction-setting position.

A control or a method which is characterized in that an automatic setting of the rollers to a brake position is provided, for example, when the movable unit has come to a standstill but that the automatic setting of the rollers to the brake position can only be made when the travel drive is not activated.

A control or a method which is characterized in that the movable unit has a rechargeable battery which can be charged by means of a connection to the electrical mains, preferably via a mains plug, when required or from time to time, and that when a mains connection is made, the rollers are automatically set to the brake position and/or the travel drive cannot be activated.

All the disclosed features are (for themselves) essential to the invention. The disclosure content of the relevant/appended priority documents (copy of the prior application) is herewith included in its full content in the disclosure of the application, also for the purpose of incorporating features of these documents in claims of the present application. The subclaims with their features characterize independent inventive further developments of the prior art, in particular in order to make divisional applications based on these claims.

REFERENCE LIST

1 Hospital bed
2 Roller
3 Additional roller
4 Control unit
5 Hand piece
6 Switch/display
7 Rechargeable battery
8 Mains plug 9 Lead
10 Motion sensor

The invention claimed is:

1. Control of rollers mounted on a movable part
wherein one, several or all of the rollers have a brake mechanism whereby the one, the several, or all of the rollers can be set to a direction-setting position, a release position and automatically to a brake position,
wherein further at least the one or the several of the rollers can be actuated electrically and the one or the several or all the rollers can additionally be actuated manually,
wherein further an additional roller with a wheel having an activatable travel drive is provided,
wherein the travel drive can only be activated when all the rollers having a brake mechanism, be it the one or a plurality of the rollers, are not located in the brake position but are set in the direction-setting position or in the release position,
wherein the automatic setting of the rollers to the brake position can only be made when the travel drive is not activated, and
wherein further when one, several, or all of the rollers are set to the brake position and the additional roller is located in a lowered position, the additional roller is automatically moved or moves into a risen position.

2. The control according to claim 1, wherein a movable unit has a rechargeable battery which can be charged by a connection to an electrical mains, when required or from time to time, and wherein when the connection is made, the rollers are automatically set to the brake position.

3. The control according to claim 1, wherein a movable unit has a rechargeable battery which can be charged by a connection to an electrical mains, when required or from time to time, and wherein when the connection is made, the travel drive cannot be activated.

4. The control according to claim 1, wherein the movable part is a hospital bed.

5. The control according to claim 1, wherein all of the rollers are actuated electrically.

6. The control according to claim 2, wherein the connection to the electrical mains is via an external electrical utility network plug.

7. The control according to claim 3, wherein the connection to the electrical mains is via an external electrical utility network plug.

8. Method for controlling rollers mounted on a movable part, wherein one, several or all of the rollers have a brake mechanism, the method comprising the following steps:
setting the one, the several, or all of the rollers to a direction-setting position, a release position and automatically to a brake position, wherein at least the one or the several of the rollers can be actuated electrically and the one or the several or all the rollers can additionally be actuated manually; and
providing an additional roller with a wheel having an activatable travel drive;
wherein the travel drive can only be activated when all the rollers having a brake mechanism, be it the one or a plurality, are not located in the brake position but are set in the direction-setting position or in the release position;
wherein the automatic setting of the rollers to the brake position can only be made when the travel drive is not activated; and
wherein further when one, several, or all of the rollers are set to the brake position and the additional roller is located in a lowered position, the additional roller is automatically moved or moves into a risen position.

9. The method for control according to claim 8, wherein the movable part is a hospital bed.

10. The method for control according to claim 8, further comprising:
charging a rechargeable battery of a movable unit by a connection to an electrical mains, when required or from time to time; and
wherein when the connection is made, the rollers are automatically set to the brake position.

11. The method for control according to claim 10, wherein the connection to the electrical mains is via an external electrical utility network plug.

12. The method for control according to claim 8, further comprising:
charging a rechargeable battery of a movable unit by a connection to an electrical mains, when required or from time to time; and
wherein when the connection is made, the travel drive cannot be activated.

13. The method for control according to claim 12, wherein the connection to the electrical mains is via an external electrical utility network plug.

14. The method for control according to claim 8, wherein all of the rollers are actuated electrically.

* * * * *